United States Patent
Bae

(10) Patent No.: US 7,859,553 B2
(45) Date of Patent: Dec. 28, 2010

(54) IMAGE NAVIGATION IN A MOBILE STATION

(75) Inventor: Joung-Sun Bae, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 11/321,001

(22) Filed: Dec. 28, 2005

(65) Prior Publication Data

US 2006/0209023 A1      Sep. 21, 2006

(30) Foreign Application Priority Data

Dec. 30, 2004   (KR) .................... 10-2004-0116955

(51) Int. Cl.
G09G 5/00           (2006.01)
(52) U.S. Cl. .................... 345/659; 345/156; 345/158; 345/173
(58) Field of Classification Search ......... 345/156–179, 345/659; 361/683; 455/556.1; 370/338; 348/333.06
See application file for complete search history.

(56) References Cited

U.S. PATENT DOCUMENTS

| | | | |
|---|---|---|---|
| 6,184,847 B1 * | 2/2001 | Fateh et al. ............... | 345/8 |
| 6,466,198 B1 * | 10/2002 | Feinstein .................. | 345/158 |
| 6,788,293 B1 * | 9/2004 | Silverbrook et al. ........ | 345/173 |
| 6,798,429 B2 * | 9/2004 | Bradski ................... | 345/156 |
| 6,933,923 B2 * | 8/2005 | Feinstein ................. | 345/158 |
| 7,091,959 B1 * | 8/2006 | Clary ..................... | 345/173 |
| 7,271,795 B2 * | 9/2007 | Bradski ................... | 345/158 |
| 7,289,102 B2 * | 10/2007 | Hinckley et al. ........... | 345/156 |
| 7,301,528 B2 * | 11/2007 | Marvit et al. .............. | 345/156 |
| 7,301,529 B2 * | 11/2007 | Marvit et al. .............. | 345/156 |
| 2002/0093483 A1 * | 7/2002 | Kaplan .................... | 345/158 |
| 2005/0083314 A1 * | 4/2005 | Shalit et al. ............... | 345/179 |
| 2006/0227742 A1 * | 10/2006 | Furukawa ................. | 370/329 |

FOREIGN PATENT DOCUMENTS

| | | |
|---|---|---|
| JP | 8095739 | 4/1996 |
| WO | WO 2004020951 | 3/2004 |

* cited by examiner

*Primary Examiner*—Jin-Cheng Wang
(74) *Attorney, Agent, or Firm*—Lee, Hong, Degerman, Kang & Waimey

(57) ABSTRACT

An image navigation apparatus in a mobile station comprises a tilt sensor unit adapted to sense a tilt of the mobile station based on information related to a distance between a reference point and a target point on a displayed image. The image navigation apparatus also comprises a processing unit operatively coupled to the tilt sensor, adapted to move the displayed image according to the tilt sensed by the tilt sensor. The image navigation apparatus may further comprise a display unit operatively coupled to the processing unit, adapted to show movement of the displayed image according to the tilt sensed by the tilt sensor. The tilt of the mobile station may comprise at least one of a tilt degree and a tilt direction.

8 Claims, 3 Drawing Sheets

IMAGE NAVIGATION IN A MOBILE STATION

CROSS-REFERENCE TO RELATED APPLICATIONS

Pursuant to 35 U.S.C. §119(a), this application claims the benefit of earlier filing date and right of priority to Korean Application No. 2004-0116955, filed on Dec. 30, 2004, the contents of which are hereby incorporated by reference herein in their entirety.

FIELD OF THE INVENTION

The present invention relates generally to a mobile station and, more particularly, to image navigation in a mobile station.

BACKGROUND OF THE INVENTION

A mobile station may serve as a portable entertainment system by including a multi-function camera and a high resolution display unit. Meanwhile, other developments such as those related to battery technologies, have enabled production of more compact and lightweight mobile stations. Thus, although a high resolution display unit is provided, because of the compact size of the mobile station, a user may be unable to view an entire image, such as a map or webpage.

To address this problem, various methods use virtual images to navigate a larger image by controlling the mobile station. One such method uses a tilt sensor to sense tilt of the mobile station with respect to an X axis and a Y axis. A processor uses the X and Y tilt values to move an image on the display unit. The image is moved with a fixed gravity acceleration value. Therefore, the image is moved in proportion to the degree that the mobile station is tilted by the user, regardless of which application is running or how much detail the image contains. Thus, because the image is moved at a fixed rate regardless of what application (e.g., a map application or a game application) is running, the movement of the image may be awkward for the user.

SUMMARY OF THE INVENTION

Accordingly, the present invention is directed to image navigation in a mobile station that substantially obviates one or more problems due to limitations and disadvantages of the related art.

An object of the present invention is to provide for image navigation in a mobile station. The image navigation may use motion of a virtual image on a display to enable navigation of the image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, an image navigation apparatus in a mobile station comprises a tilt sensor unit adapted to sense a tilt of the mobile station based on information related to a distance between a reference point and a target point on a displayed image. The image navigation apparatus also comprises a processing unit operatively coupled to the tilt sensor, adapted to move the displayed image according to the tilt sensed by the tilt sensor.

The image navigation apparatus may further comprise a display unit operatively coupled to the processing unit, adapted to show movement of the displayed image according to the tilt sensed by the tilt sensor. The tilt of the mobile station may comprise at least one of a tilt degree and a tilt direction. The processing unit may be further adapted to output a reference voltage value to the tilt sensor based on the information related to the distance between the reference point and the target point on the displayed image, and wherein the tilt sensor is further adapted to sense the tilt of the mobile station based on the reference voltage value. The tilt degree may be determined by an orientation angle of the reference point to the target point.

The image navigation apparatus may further comprise a voltage distributing unit operatively coupled to the processing unit, adapted to output a reference voltage to the tilt sensor based on the information related to the distance between the reference point and the target point on the displayed image. The tilt sensor may be further adapted to sense the tilt of the mobile station based on the reference voltage value. The reference point may be a central point on the displayed image before movement. The target point may be a central point on the displayed image after movement according to the tilt of the mobile station.

In another embodiment, a mobile station having an image navigation apparatus comprises a transceiver adapted to transmit and receive wireless communications, and a user interface operatively coupled to the transceiver, adapted to enable a user to control mobile station functions. The mobile station also comprises a tilt sensor unit adapted to sense a tilt of the mobile station based on information related to a distance between a reference point and a target point on a displayed image. The mobile station also comprises a processing unit operatively coupled to the transceiver and the tilt sensor, adapted to move the displayed image according to the tilt sensed by the tilt sensor.

In yet another embodiment, an image navigation method for a mobile station comprises sensing a tilt of the mobile station based on information related to a distance between a reference point and a target point on a displayed image. The method also comprises moving the displayed image according to the sensed tilt.

The method may further comprise displaying movement of the displayed image according to the sensed tilt. The may further comprises outputting a reference voltage value based on the information related to the distance between the reference point and the target point on the displayed image and sensing the tilt of the mobile station based on the reference voltage value. The sensing of the tilt may further comprise processing information related to an orientation angle of the reference point to the target point.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The term 'mobile station' encompasses mobile phones, handsets, PDAs (personal digital assistants), and computers, as well as any other devices with wireless communication capabilities. Image navigation in a mobile station is described below. The image navigation may use motion of a virtual image on a display to enable navigation of the image.

Figure 1:
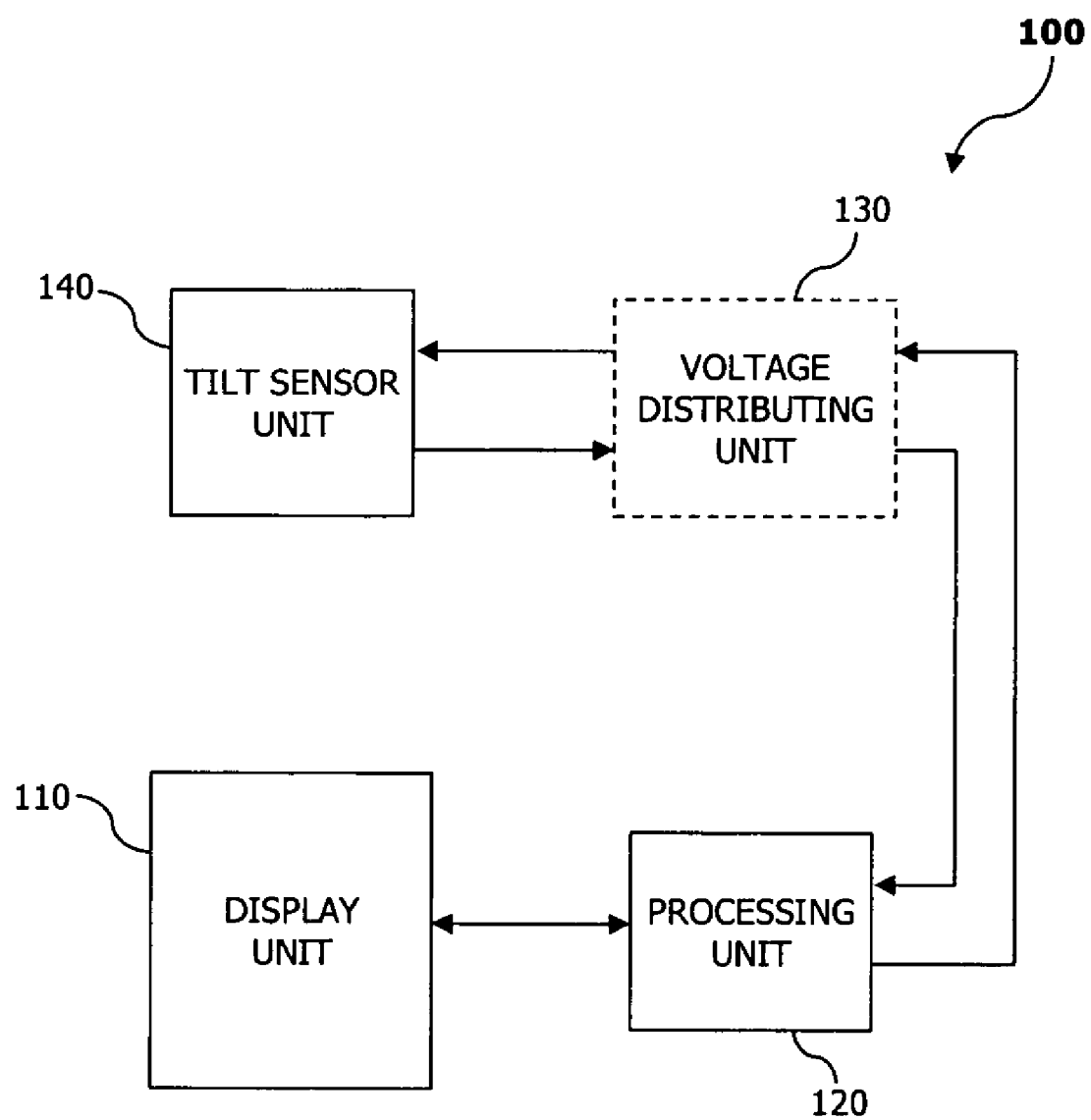
FIG. 1 is a block diagram illustrating an image navigation apparatus, according to an embodiment of the present invention.

FIG. 1 is a block diagram illustrating an image navigation apparatus (e.g., virtual image motion apparatus) 100, according to an embodiment of the present invention.

Referring to FIG. 1, the virtual image motion apparatus 100 includes a processing unit 120 to read a direction of a reference point and a target point of an image displayed on a display unit 110. The processing unit 120 also calculates an angle and a distance between the reference point and the target point. The virtual image motion apparatus 100 also includes a voltage distributing unit 130 to distribute a voltage (e.g., a switched voltage) based on a calculation result from the processing unit 120. The virtual image motion apparatus 100 also includes a tilt sensor unit 140 to measure a tilt of a mobile station using the distributed voltage from the voltage distributing unit 130 as a reference voltage. The virtual image motion apparatus 100 also includes a display unit 110 to display a moving image according to the tilt sensed by the tilt sensor unit 140.

The processing unit 120 reads a direction of a reference point of an image displayed on the display unit 110, and also reads a direction of a target point to reach from the current image. The processing unit 120 then calculates an angle and a distance between the reference point and the target point. The reference point is a central point of the current image and the target point may be a central point of an image to be formed according to a direction of a tilt when the user tilts the mobile station. Alternatively, the target point may be generated according to an application (e.g., software application). The reference point and target point may differ according to an application being used in the mobile station.

For example, when an electronic map application is run in the mobile station, a central point of a certain portion of the map displayed on the display unit 110 may become the reference point. Accordingly, when the user tilts the mobile station rightward, a target point is the center of a portion positioned at the right side of the map based on the current portion being displayed on the display unit, that is, the center of a portion currently at the right side to be displayed on the display unit after the image is moved rightward. The central point of the map may be a well known geographical feature, such as a mountain, lake, or building, for example.

In another example, a user plays an archery game using the mobile station. For the game, a position at which an archery bow is located may become the reference point and a mark to be hit by an arrow may become the target point.

The processing unit 120 may change the reference voltage of the tilt sensor unit 140 via the voltage distributing unit 130 according to the calculated result. Alternatively, the processing unit 120 may directly adjust the reference voltage of the tilt sensor unit 140. As such, the voltage distributing unit 130 may not be required. A change to the reference voltage causes a corresponding change to the value of the gravity acceleration (g). The tilt sensor unit 140 senses tilt of the mobile station and transmits a sensed tilt value to the processing unit 120. Upon receiving the sensed tilt value from the tilt sensor unit 140, the processing unit 120 moves the image displayed on the display unit 110 according to the direction and degree of the tilt.

Figure 2:
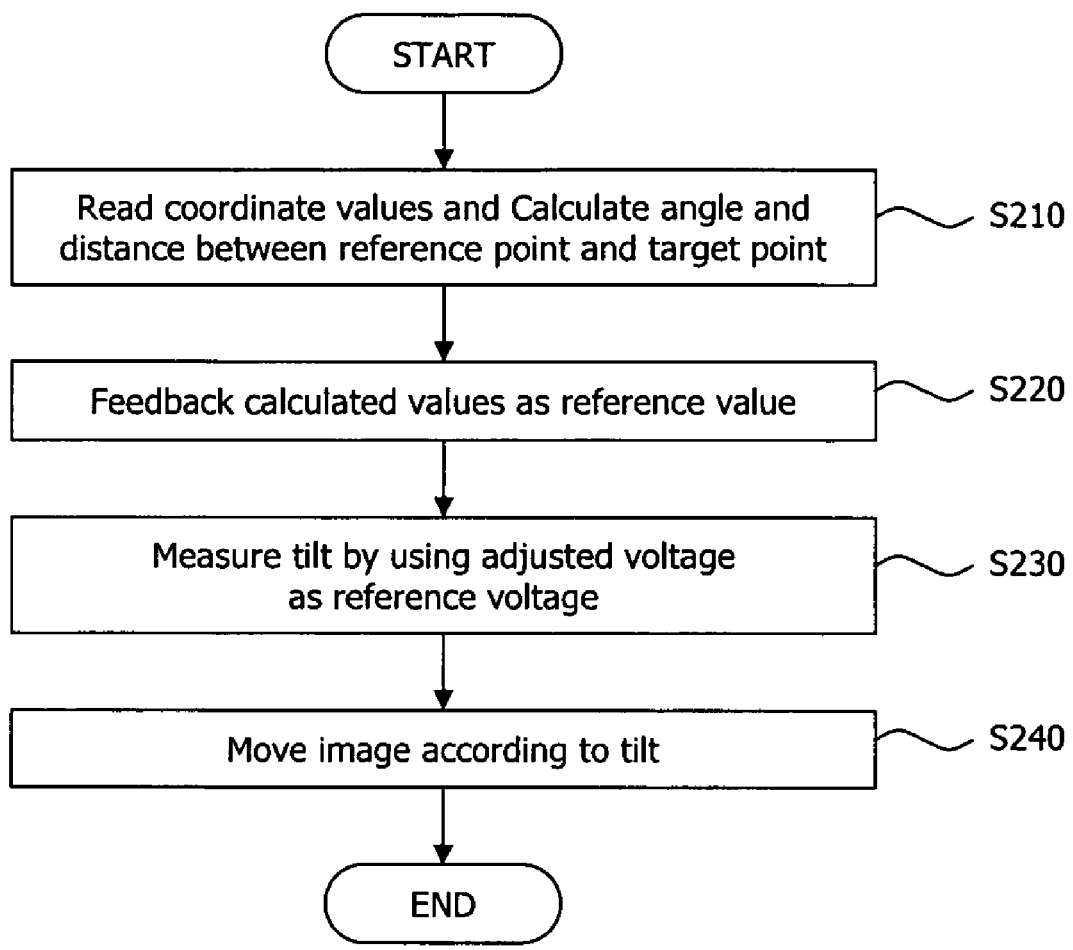
FIG. 2 is a flow diagram illustrating an image navigation method, according to an embodiment of the present invention.

FIG. 2 is a flow diagram illustrating an image navigation method (e.g., virtual image motion method), according to an embodiment of the present invention.

Referring to FIG. 2, the mobile station reads coordinate values of a reference point and a target point on an image displayed on the display unit and calculates an angle and a distance between the reference point and the target point (step S210). The mobile station then feeds back the calculated value as a reference voltage (step S220). As such, the mobile station may feed back the reference voltage through the voltage distributing unit 130 or by directly controlling a voltage. After feedback of the reference voltage is completed, the mobile station senses tilt of the mobile station using the feedback reference voltage (step S230) and moves the image displayed on the display unit according to the sensed tilt (step S240).

Figure 3:
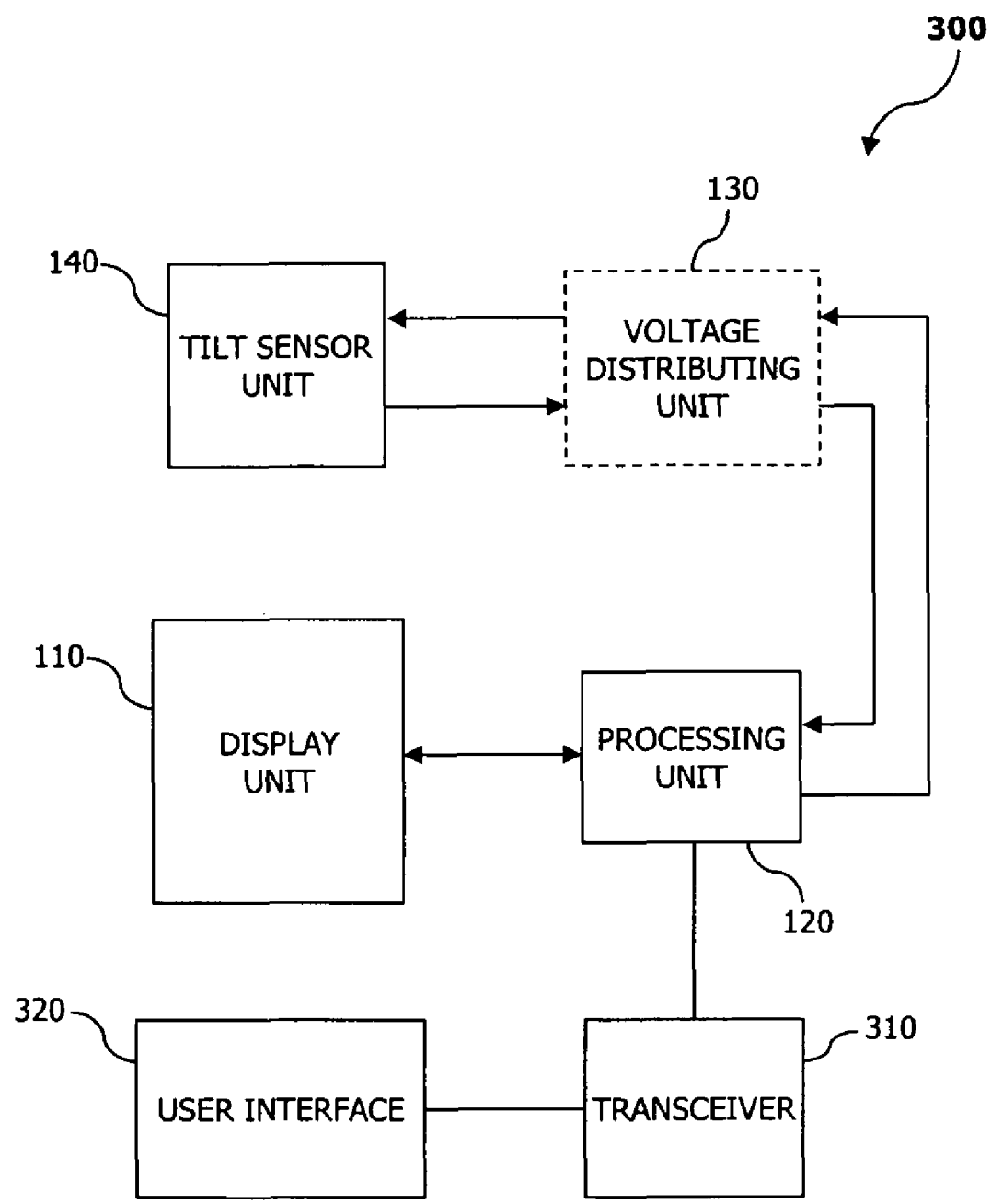
FIG. 3 is a block diagram of a mobile station having an image navigation apparatus, according to an embodiment of the present invention.

FIG. 3 is a block diagram of a mobile station 300 having an image navigation apparatus, according to an embodiment of the present invention. The mobile station 300 may be used in conjunction with the methods described herein.

Referring to FIG. 3, the mobile station 300 includes a transceiver 310, adapted to transmit and receive wireless communications. The mobile station also includes a user interface 320 operatively coupled to the transceiver 310, adapted to enable a user to control mobile station functions. The mobile station 300 also includes the tilt sensor unit 140, the display unit 110, and the processing unit 120. The mobile station 300 may also include the voltage distributing unit 130.

In one embodiment, an image navigation apparatus in a mobile station comprises a tilt sensor unit adapted to sense a tilt of the mobile station based on information related to a distance between a reference point and a target point on a displayed image. The image navigation apparatus also comprises a processing unit operatively coupled to the tilt sensor, adapted to move the displayed image according to the tilt sensed by the tilt sensor.

The image navigation apparatus may further comprise a display unit operatively coupled to the processing unit, adapted to show movement of the displayed image according to the tilt sensed by the tilt sensor. The tilt of the mobile station may comprise at least one of a tilt degree and a tilt direction.

The processing unit may be further adapted to output a reference voltage value to the tilt sensor based on the information related to the distance between the reference point and the target point on the displayed image, and wherein the tilt sensor is further adapted to sense the tilt of the mobile station based on the reference voltage value. The tilt degree may be determined by an orientation angle of the reference point to the target point.

The image navigation apparatus may further comprise a voltage distributing unit operatively coupled to the processing unit, adapted to output a reference voltage to the tilt sensor based on the information related to the distance between the reference point and the target point on the displayed image. The tilt sensor may be further adapted to sense the tilt of the mobile station based on the reference voltage value. The reference point may be a central point on the displayed image before movement. The target point may be a central point on the displayed image after movement according to the tilt of the mobile station.

In another embodiment, a mobile station having an image navigation apparatus comprises a transceiver adapted to transmit and receive wireless communications, and a user interface operatively coupled to the transceiver, adapted to enable a user to control mobile station functions. The mobile station also comprises a tilt sensor unit adapted to sense a tilt of the mobile station based on information related to a distance between a reference point and a target point on a displayed image. The mobile station also comprises a processing unit operatively coupled to the transceiver and the tilt sensor, adapted to move the displayed image according to the tilt sensed by the tilt sensor.

In yet another embodiment, an image navigation method for a mobile station comprises sensing a tilt of the mobile station based on information related to a distance between a reference point and a target point on a displayed image. The method also comprises moving the displayed image according to the sensed tilt.

The method may further comprise displaying movement of the displayed image according to the sensed tilt. The may further comprises outputting a reference voltage value based on the information related to the distance between the reference point and the target point on the displayed image and sensing the tilt of the mobile station based on the reference voltage value. The sensing of the tilt may further comprise processing information related to an orientation angle of the reference point to the target point.

In the present invention, a distance and an angle between a reference point and a target point of an image displayed on the display unit of the mobile station are determined. A reference voltage is provided as feedback from the determination, and a tilt of the mobile station is measured based on the feedback reference voltage. Accordingly, an image displayed on the mobile station may be searched. A sensitivity degree may be adjusted according to a mobile station application, or other parameter, to optimize movement of a virtual image.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. An image navigation apparatus in a mobile station configured to process a plurality of applications, the image navigation apparatus comprising:

a display unit configured to display an image related to one of the plurality of applications;

a processing unit configured to read coordinates of a reference point and a target point on the image displayed on the display unit to calculate an angle and a distance between the target point and the reference point; and a voltage distributing unit operatively coupled to the processing unit and configured to distribute a voltage to a tilt sensor unit, the voltage distributing unit generating a new reference voltage corresponding to the one of the plurality of applications based on the calculated angle and distance, wherein the tilt sensor unit is configured to sense a tilt of the mobile station by using the new reference voltage, a sensitivity degree of the tilt sensor unit adjusted according to an application being executed such that the sensitivity degree is not the same for all of the plurality of applications, wherein navigation of the displayed image is based on motion of a virtual image on the display unit, wherein the processing unit is further configured to move the displayed image according to the tilt sensed by the tilt sensor unit, wherein the reference point and target point are determined by a position of the displayed image moved if the displayed image is moved according to the sensed tilt, and wherein the target point is generated according to the application being executed such that different reference points and target points are set for each of the plurality of applications.

2. The image navigation apparatus of claim 1, wherein the tilt of the mobile station comprises a tilt direction.

3. The image navigation apparatus of claim 2, wherein the tilt of the mobile station further comprises a tilt degree.

4. The image navigation apparatus of claim 3, wherein the tilt degree is determined by an orientation angle of the reference point to the target point.

5. An image navigation method for a mobile station configured to process a plurality of applications, the method comprising:

displaying an image related to one of the plurality of applications;

reading coordinates of a reference point and a target point on the displayed image;

calculating an angle and a distance between the reference point and the target point based upon the read coordinates of the reference point and the target point;

generating a new reference voltage corresponding to the one of the plurality of applications based upon the calculated angle and distance;

sensing a tilt of the mobile station by using the generated new reference voltage, a sensitivity degree adjusted according to an application being executed such that the sensitivity degree is not the same for all of the plurality of applications; and moving the displayed image according the sensed tilt, wherein the reference point and target point are determined by a position of the displayed image moved if the displayed image is moved according to the sensed tilt, and wherein the target point is generated according to the application being executed such that different reference points and target points are set for each of the plurality of applications.

6. The image navigation method of claim 5, wherein the tilt of the mobile station comprises a tilt direction.

7. The image navigation method of claim 5, wherein the sensing of the tilt further comprises:
processing information related to an orientation angle of the reference point to the target point.

8. The image navigation method of claim 5, wherein the mobile station comprises a mobile phone.

* * * * *